United States Patent
Park et al.

(10) Patent No.: US 10,172,178 B2
(45) Date of Patent: Jan. 1, 2019

(54) WIRELESS LAN STATION HAVING PLATFORM CAPABLE OF CHANGING WIRELESS LAN CONNECTION TECHNIQUE

(71) Applicant: LG Electronics Inc., Seoul (KR)

(72) Inventors: Giwon Park, Seoul (KR); Byungjoo Lee, Seoul (KR); Dongcheol Kim, Seoul (KR); Hyunhee Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/545,102

(22) PCT Filed: Jan. 27, 2016

(86) PCT No.: PCT/KR2016/000886
§ 371 (c)(1),
(2) Date: Jul. 20, 2017

(87) PCT Pub. No.: WO2016/122209
PCT Pub. Date: Aug. 4, 2016

(65) Prior Publication Data
US 2018/0020498 A1  Jan. 18, 2018

Related U.S. Application Data

(60) Provisional application No. 62/116,532, filed on Feb. 15, 2015, provisional application No. 62/109,546, filed on Jan. 29, 2015.

(51) Int. Cl.
*H04W 4/00* (2018.01)
*H04W 76/23* (2018.01)
(Continued)

(52) U.S. Cl.
CPC ........... *H04W 76/23* (2018.02); *H04W 48/08* (2013.01); *H04W 48/14* (2013.01); *H04W 76/10* (2018.02);
(Continued)

(58) Field of Classification Search
CPC ..... H04W 76/23; H04W 76/14; H04W 76/20; H04W 76/10; H04W 48/14; H04W 48/08; H04W 92/18; H04W 84/12
See application file for complete search history.

(56) References Cited

U.S. PATENT DOCUMENTS

2016/0165376 A1* 6/2016 Qi ........................... H04L 67/16
455/414.1

FOREIGN PATENT DOCUMENTS

KR  1020120092315  8/2012
KR  1020140020179  2/2014
(Continued)

*Primary Examiner* — Afshawn M Towfighi
(74) *Attorney, Agent, or Firm* — Dentons US LLP

(57) ABSTRACT

Proposed is a method for receiving a Wi-Fi service by a wireless LAN station supporting an application service platform (ASP). Specifically, the Wi-Fi service can be received through at least two connection techniques, for example, a Wi-Fi direct connection of Wi-Fi infrastructure connection may be used. The wireless LAN station having an ASP may detect information on each of the connection techniques and may be provided with the Wi-Fi service using one of the connection techniques. In addition, when a change in a communication environment or the like occurs, the connection technique may be switched and, in this case, signaling for switching the connection technique may be used.

12 Claims, 9 Drawing Sheets

(51) Int. Cl.
*H04W 76/10* (2018.01)
*H04W 76/20* (2018.01)
*H04W 48/08* (2009.01)
*H04W 48/14* (2009.01)
*H04W 92/18* (2009.01)
*H04W 76/14* (2018.01)
*H04W 84/12* (2009.01)

(52) U.S. Cl.
CPC ........... *H04W 76/14* (2018.02); *H04W 76/20* (2018.02); *H04W 92/18* (2013.01); *H04W 84/12* (2013.01)

(56) References Cited

FOREIGN PATENT DOCUMENTS

| KR | 1020140129970 | 11/2014 |
| WO | 2014025240 | 2/2014 |
| WO | 2014182814 | 11/2014 |

\* cited by examiner

WIRELESS LAN STATION HAVING PLATFORM CAPABLE OF CHANGING WIRELESS LAN CONNECTION TECHNIQUE

CROSS-REFERENCE TO RELATED APPLICATIONS

This application is the National Stage filing under 35 U.S.C. 371 of International Application No. PCT/KR2016/000886, filed on Jan. 27, 2016, which claims the benefit of U.S. Provisional Applications No. 62/109,546 filed on Jan. 29, 2015, and No. 62/116,532 filed on Feb. 15, 2015, the contents of which are all hereby incorporated by reference herein in their entirety.

BACKGROUND OF THE INVENTION

Field of the Invention

The present invention relates to a wireless LAN station having a platform capable of changing a wireless LAN connection technique and a method using the same and, most particularly, to a device including an application service platform (ASP) capable of changing a connection technique and a method using the same.

Related Art

In the Wi-Fi Alliance (WFA), a Wi-Fi Direct service (WFDS), which supports diverse services using a Wi-Fi Direct link (e.g., Send, Play, Display, Print, and so on), is being researched. According to the WFDS, an application may be controlled or managed by a service platform, which is referred to as an Application Service Platform (ASP).

WFDS device supporting a WFDS includes devices supporting a wireless LAN system, such as display devices, printers, digital cameras, projectors, smart phones, and so on. Also, the WFDS device may include an STA and an AP. WFDS devices within a WFDS network may be directly connected to one another.

A WFDS framework may include a Wi-Fi Direct layer 100, an ASP 120, a service layer 140, and an application layer 160.

FIG. 1 is a conceptual diagram illustrating Wi-Fi Direct Service (WFDS) configuration elements (or components).

Referring to FIG. 1, the WFDS framework may include a Wi-Fi Direct layer 100, an ASP 120, a service layer 140, and an application layer 160.

The Wi-Fi Direct layer 100 corresponds to a medium access control (MAC) layer, which is defined in the Wi-Fi Direct standard. A wireless connection may be configured by a physical layer (not shown), which is backward compatible with a Wi-Fi PHY, below the Wi-Fi Direct layer 100. An Application Service Platform (ASP) 120 is defined above the Wi-Fi Direct layer 100.

The ASP 120 corresponds to a common shared platform, and the ASP 120 performs the functions of session management, service command processing, and control and security between ASPs between the Application layer 160, which is a higher layer of the ASP 120, and the Wi-Fi Direct layer 100, which is a lower layer of the ASP 120.

The Service layer 140 is defined above the ASP 120. For example, the Service layer 140 may support 4 basic service, which correspond to Send, Play, Display, and Print services, and a service that is defined in a third-party application. Moreover, the Service layer 140 may also support Wi-Fi Serial Bus (WSB), Wi-Fi Docking, or Neighbor Awareness Networking (NAN).

The application layer 160 may provide a user interface (UI), and the application layer 160 may also express information in a format that can be recognized by human beings and may deliver (or transport) user input to a lower layer.

SUMMARY OF THE INVENTION

Technical Objects

This specification proposes a method related to a new framework that has enhanced the related art WFDS framework. More specifically, in case an additional connectivity scheme is provided within a new framework other than the related art Wi-Fi Direct connection, an object of this specification is to propose an enhanced method and device for controlling such additional connectivity scheme. More specifically, this specification proposes a method of being provided with a Wi-fi service by using a Wi-fi infrastructure other than the Wi-Fi Direct connectivity scheme, and a method of changing the connectivity scheme.

Technical Solutions

This specification proposes a method for receiving a Wi-Fi service in a wireless LAN station supporting an application service platform (ASP).

More specifically, the ASP may receive a first seek service message in order to discover a wireless LAN station providing the Wi-Fi service through the Wi-Fi direct connectivity.

Also, the ASP may acquire information on a wireless LAN station providing the Wi-Fi service through a Wi-Fi direct connectivity by using the first seek service message.

Also, the ASP may receive a second seek service message in order to discover a wireless LAN station providing the Wi-Fi service through the Wi-Fi Infrastructure connectivity.

Also, the ASP may acquire information on a wireless LAN station providing the Wi-Fi service through a Wi-Fi Infrastructure connectivity by using the second seek service message.

And, based on the information acquired by using the first seek service message and the second seek service message, any one of the Wi-Fi direct connectivity and the Wi-Fi Infrastructure connectivity may be selected, and the Wi-Fi service may be received by using the selected connectivity.

Also, it may be determined whether or not to receive the Wi-Fi service through a connectivity that is different from the connectivity selected between the Wi-Fi Direct connectivity and the Wi-Fi Infrastructure connectivity.

The above-described method may be configured in a wireless station being equipped with an ASP, and each process step may be performed by a processor, which is equipped in the wireless station.

Effects of the Invention

In case of using the technique according to this specification, by using an ASP related to an enhanced WFDS, two or more types of Wi-Fi connection techniques may be efficiently controlled.

DESCRIPTION OF EXEMPLARY EMBODIMENTS

Figure 1:
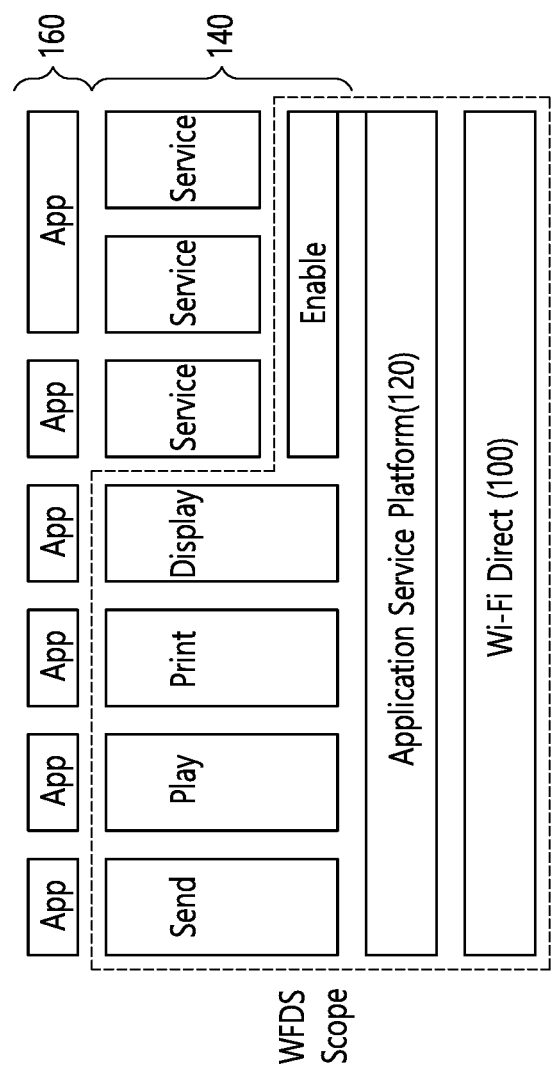
FIG. 1 is a conceptual diagram illustrating Wi-Fi Direct Service (WFDS) configuration elements (or components).
Figure 2:
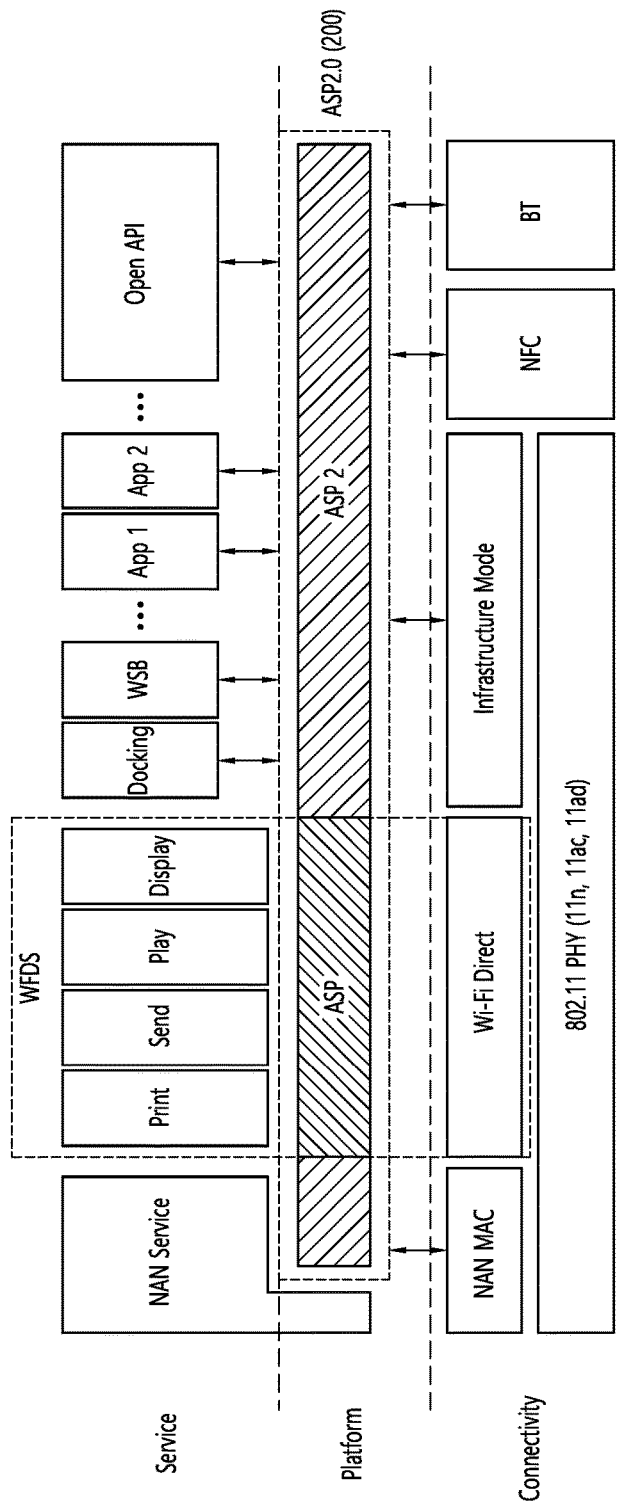
FIG. 2 is a block diagram illustrating configuration elements of a Wi-Fi direct Service (WFDS) framework to which the exemplary embodiment of this specification can be applied.

FIG. 2 is a block diagram illustrating configuration elements of a Wi-Fi direct Service (WFDS) framework to which the exemplary embodiment of this specification can be applied. Unlike the framework of FIG. 1, the framework of FIG. 2 proposes a Neighbor Awareness Networking (NAN) mode or a Wi-Fi Infrastructure mode as additional connectivity techniques. More specifically, the structure of FIG. 2 may be controlled or managed by an ASP 2.0 platform (hereinafter referred to as ASP2), which includes the related art Application Service Platform (ASP).

For example, based on at least one of the techniques among Wi-Fi Direct (alternatively referred to as P2P), Neighbor Awareness Networking (NAN), near field communication (NFC), Bluetooth low energy (LE), and Wi-Fi infrastructure, the ASP2 200 may discover a device/service, and the ASP2 200 may handle a series of procedures until the usage of a service, such as session setup (or configuration) and connection of the device/service, and so on.

The technique proposed in this specification is related to a technique that allows a device using the ASP2 (alternatively referred to as ASP2 device, wireless LAN station, service seeker, service advertiser, and so on) to continuously maintain a service session (alternatively referred to as ASP2 session, Wi-Fi service, Wi-Fi service session, and so on) without any interruption. For example, this specification proposes a technique of changing/switching to another connection (e.g., Wi-Fi infrastructure connection), in case the quality of the current connection (e.g., P2P connection) of the ASP2 device is degraded to a level that is equal to or below a predetermined level.

Figure 3:
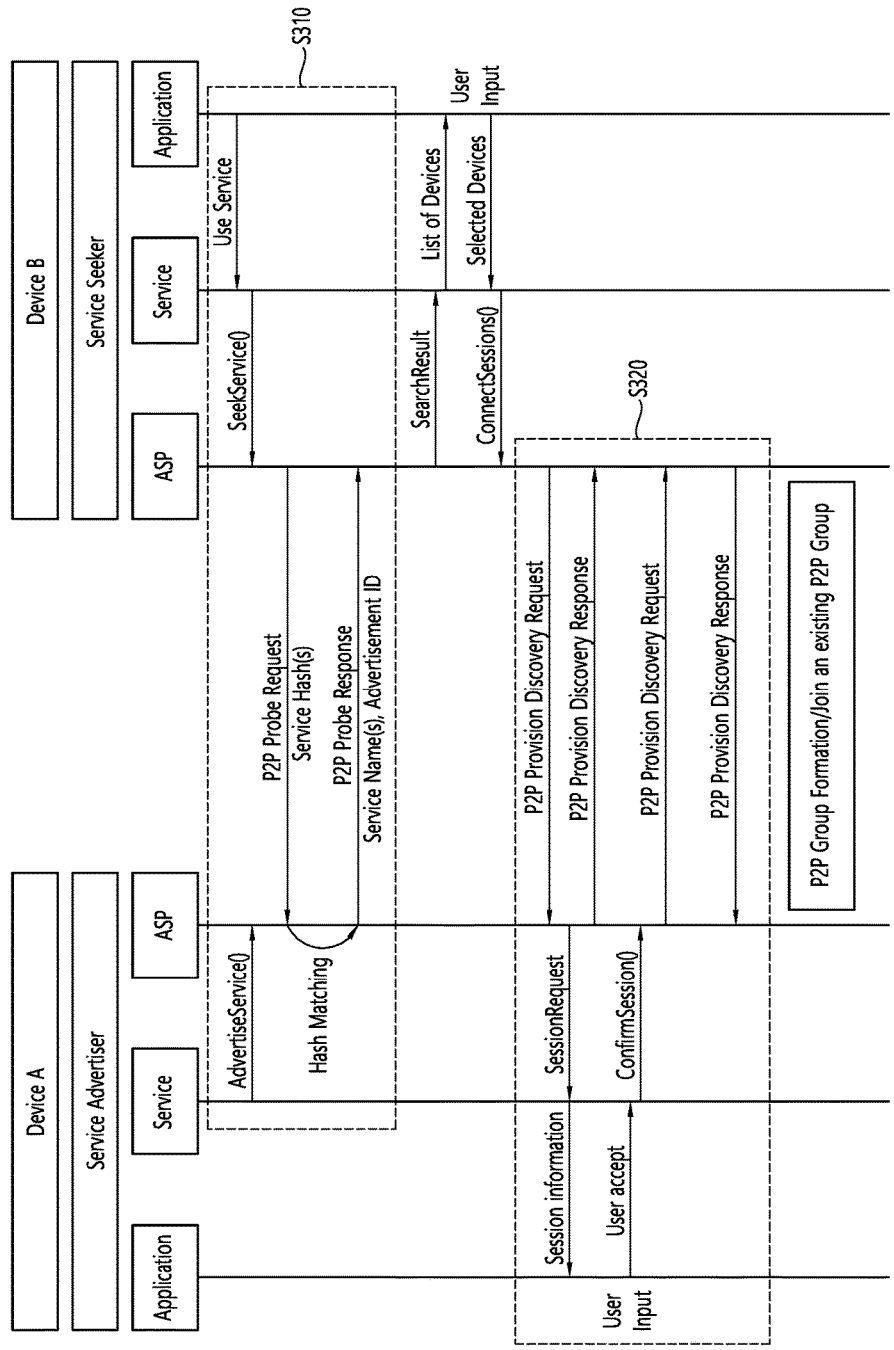
FIG. 3 is a procedure flow chart illustrating part of operations according to which a session is connected through an ASP.
Figure 4:
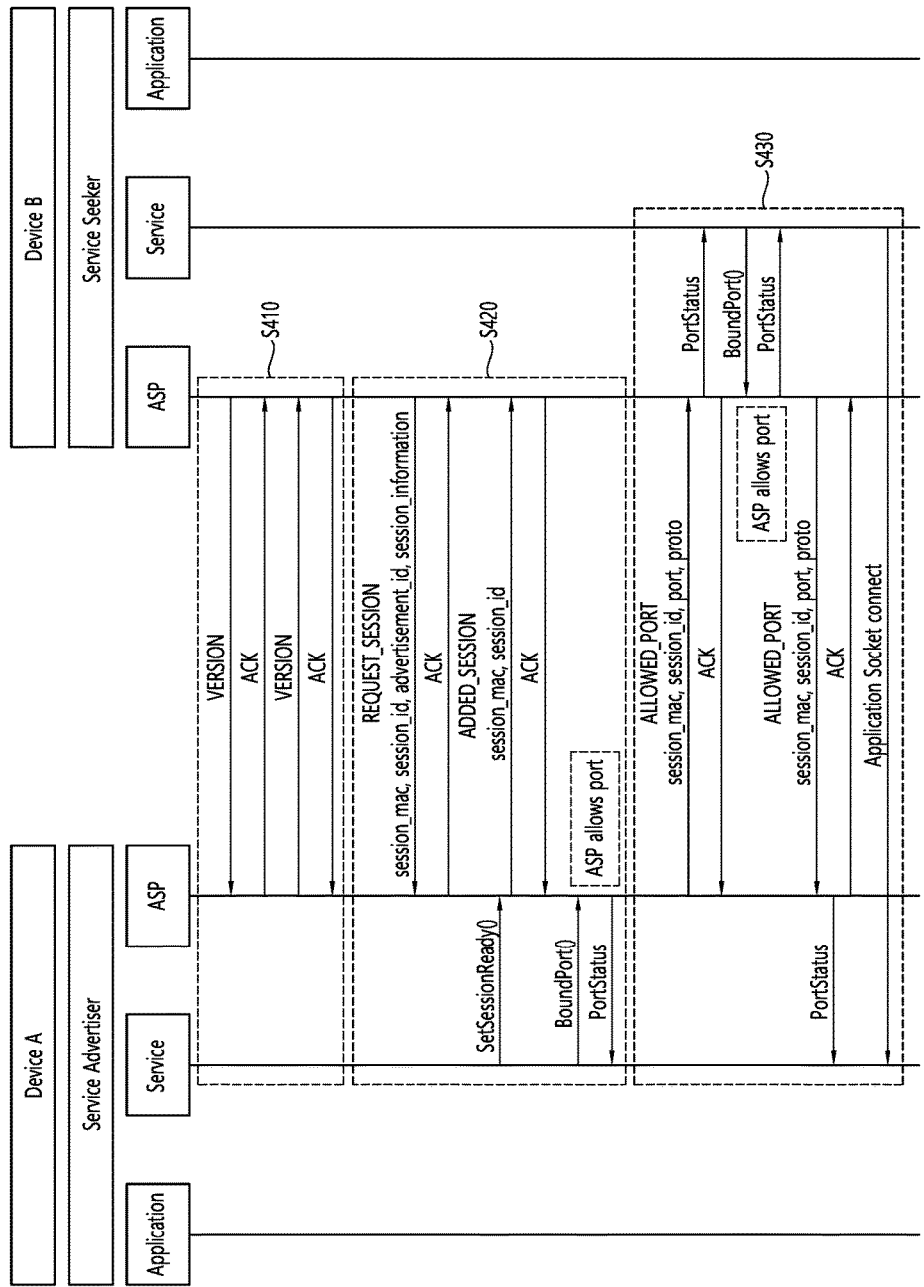
FIG. 4 is a procedure flow chart illustrating another part of the operations according to which a session is connected through an ASP.

FIG. 3 and FIG. 4 are procedure flow charts respectively illustrating parts of operations according to which a session is connected through an ASP.

More detailed description of each steps of FIG. 3 and FIG. 4 is presented in Wi-Fi Peer-to-Peer Services (P2Ps) Technical Specification Version 1.1, and so on.

The examples of FIG. 3 and FIG. 4 correspond to examples, wherein device A is a service advertiser advertising and providing services, and wherein device B is a service seeker seeking services. As shown in the drawing, each device is equipped with an entity or platform, such as an application, a service, an ASP, and so on. Each device may additionally include an ASP2 platform.

As shown in the drawing, in step S310, device A may transmit a service that can be provided by device A itself (i.e., Wi-Fi service) to an ASP of device A, and device B may include and transmit a service hash in a probe request message of a P2P connectivity scheme (e.g., Wi-Fi Direct scheme), and, as a method for receiving a response message in response to the transmitted request message, device B may seek a wanted Wi-Fi service. Although it is not shown in FIG. 3, in case additional information is required for the Wi-Fi service discovery (or search), this may be added to step S310, thereby allowing additional probe request/response messages to be transmitted/received.

Subsequently, in step S320, a procedure for transmitting and/or receiving a P2P provision discovery request/response is performed, and, afterwards, a P2P group formation step is performed. By performing this procedure, it may be determined whether to join the related art P2P group or form a new group.

If the procedure shown in FIG. 3 is completed, a connection between a first layer (L1) and a second layer (a L1/L2 connection) is established. Thereafter, a procedure for setting up an ASP session is performed.

FIG. 4 is a procedure flow chart showing a procedure for setting up an ASP session. As shown in the drawing, in step S410, version information of an ASP coordination protocol is exchanged, and, in step S420, a request message for a session (request_session) is transmitted, and a message related to an added session (added_session) is received, and, in step S430, a port for device A and device B is authorized (or allowed). If information on the allowed port is transmitted and/or received, a session is set up through the corresponding port.

Although the procedures of FIG. 3 and FIG. 4 are related to examples, wherein an ASP is equipped in each of device A and device B, the ASP2 of FIG. 2 may also be equipped to each of device A and device B. More specifically, although ASP, which is shown in FIGS. 3 and 4 are dependent to the P2P connectivity scheme (i.e., Wi-Fi Direct Connectivity scheme), in case each of devices A and B is additionally equipped with a new platform (i.e., ASP2), a session may be connected not only through the P2P connectivity scheme but also through a NAN connectivity scheme and a Wi-Fi infrastructure connectivity scheme. More specifically, since the Discovery procedure shown in FIG. 3 is configured based on a P2P connection, in case a Wi-Fi infrastructure is used, a detailed message structure may be changed (or modified). However, in case of the method using the ASP session protocol shown in FIG. 4, the method may be used as it is without any modification, even in case of using the Wi-Fi infrastructure.

This specification proposes a method for changing the connectivity scheme, in case the P2P connection service quality of a device, which is being provided with an ASP2 service (i.e., Wi-Fi service) through a P2P connection, is degraded to a predetermined level or below. More specifically, this specification proposes a method and device for maintaining a session that is being serviced by switching to a Connection Mode/Connectivity scheme using a Wi-Fi Infrastructure.

Additionally, this specification proposes a method and device for maintaining a session that is being serviced by switching to a Connection Mode/Connectivity scheme using a P2P connection (i.e., Wi-Fi Direct scheme), in case the connection quality of a device, which is being provided with an ASP2 service (i.e., Wi-Fi service) through a Wi-Fi Infrastructure, is degraded to a predetermined level or below.

The operations according to the exemplary embodiment of the present invention will hereinafter be described in detail with reference to the procedure flow charts of FIG. 5 to FIG. 8. In the examples shown in FIG. 5 to FIG. 8, device A (or user equipment A, wireless station A, and so on) and device B (or user equipment B, wireless station B, and so on) are provided with a wireless LAN connection by being associated to the same AP.

Device A is a device seeking a service (i.e., Wi-Fi service) corresponding to a service name of "org.wi-fi.wfds.send.rx", and device B is a device (or user equipment) supporting a service corresponding to the service name "org.wi-fi.wfds-.send.rx". A service name is used for identifying a service (i.e., Wi-Fi service). A service name corresponds to a UTF-8 string and is exchanged between the ASPs of each device, and the service name may be included in a method being delivered (or transported) from a service layer to an ASP/ASP2 or in an event being delivered (or transported) from the ASP/ASP2 to a service layer. Each service name begins with a symbol being indicated as "org.wi-fi" in order to identify a service, which is defined by the Wi-Fi Alliance (WFA), for example, in case of a "send" service, the service name may be expressed as "org.wi-fi.wfds.send.tx" or "org.wi-fi.wfds.send.rx". The "tx/rx", which is included at the end of the service name, is included in the service name in order to identify whether the corresponding "send" service is being transmitted or received.

Figure 5:
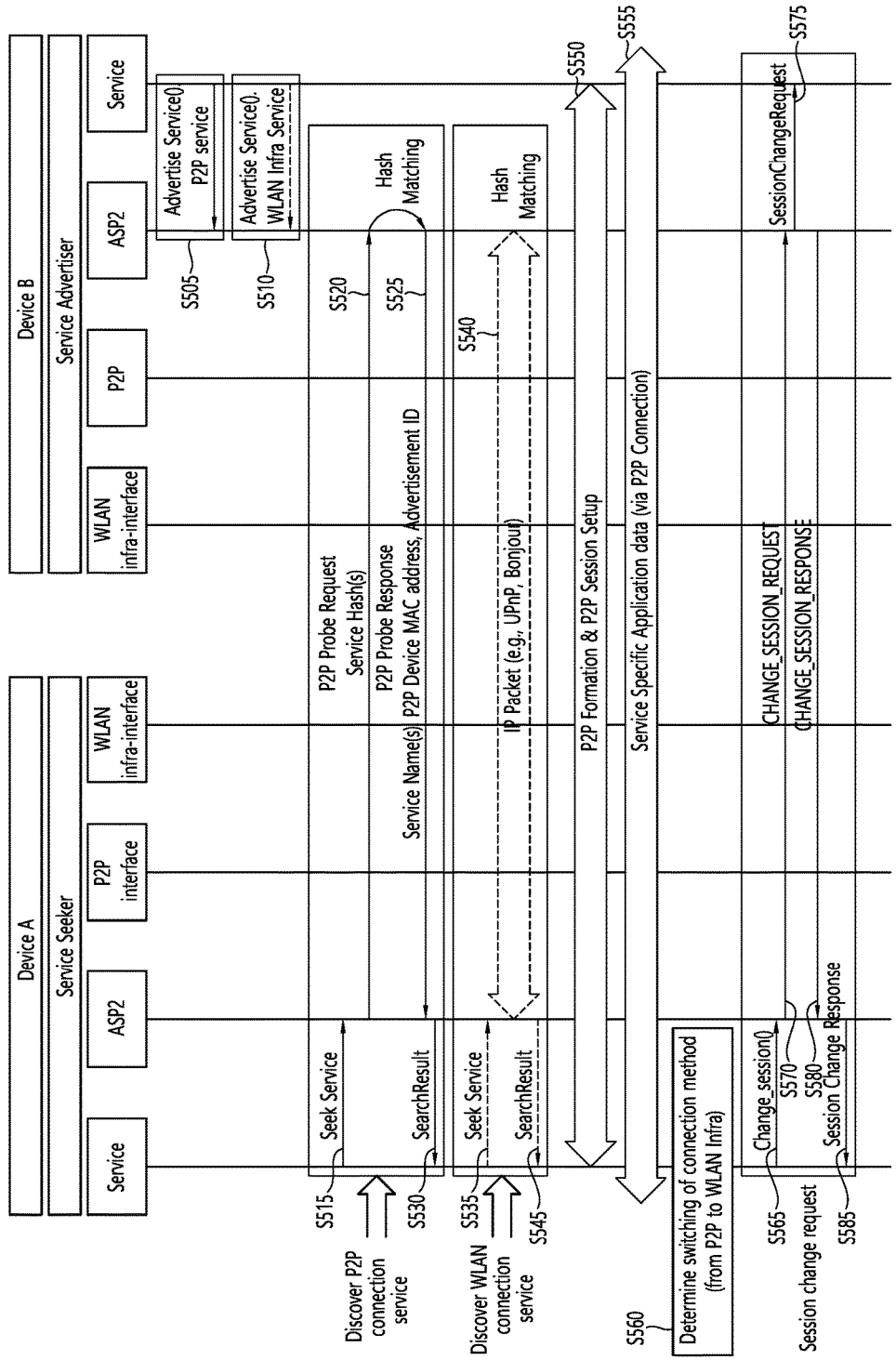
FIG. 5 is a procedure flow chart describing an example of changing the connection technique to a Wi-Fi infrastructure according to this specification.

FIG. 5 is a procedure flow chart describing an example of changing the connection technique to a Wi-Fi infrastructure according to this specification. An example of FIG. 5 relates to an example, wherein a user equipment (or device) (e.g., device A of FIG. 5) supporting ASP2 discovers a service that the device is seeking, and wherein the device sets up a service session (i.e., a session for being provided with a Wi-Fi service) through a connection of a wanted type (e.g., P2P connection or Wi-Fi infrastructure connection) so as to receive the service, and wherein the device changes the connection type to another type of connection.

As shown in step S505 and step S510 of FIG. 5, Device B, which corresponds to a service advertiser, notifies information on a service it is supporting (e.g., Wi-Fi service including services, such as "Send", and so on) to the ASP2 of Device B through a method (more specifically, an AdvertiseService ( ) method). The method corresponds to signaling that is transported (or delivered) to the ASP/ASP2 from a service layer, and, since an even corresponds to a signaling that transported to the service layer from the ASP/ASP2, by performing the corresponding method, the ASP2 of Device B may be aware of the fact that Device B supports a specific service. Also, by performing the corresponding method, a counterpart device (e.g., Device A) may acquire information on the service being supported by Device B through the ASP of Device B.

The method shown in step S505 of FIG. 5 corresponds to a method for performing advertisement of a supported service through a P2P connection, and this method may be identical to the method that is provided by the related art ASP (i.e., AdvertiseService ( ) method). More specifically, this may be identical to the advertisement method shown in step S310 of FIG. 3. More specifically, the method according to step S505 may include the related art parameters, such as "Service_name", "Auto_accept", "Service_information", "Service_status", "Network_role", "Network_config", and "Defferred_session response", and more detailed description of the corresponding parameters may be verified in Wi-Fi Peer-to-Peer Services (P2Ps) Technical Specification Version 1.1, and so on. However, information on services that are supported by other connections apart from the P2P connection cannot be acquired through the method of step S505.

Accordingly, the exemplary embodiment of this specification proposes step S510 of FIG. 5. The English names of the parameters (or method factors/information/fields/primitives, and so on) included herein may be defined in the corresponding step S510 as described below.

Firstly, at least one of the 7 parameters that are used in the related art ASP (i.e., ASP1) may be included in the method according to S510. More specifically, related art parameters, such as "Service_name", "Auto_accept", "Service_information", "Service_status", "Network_role", "Network_config", and "Defferred_session response", may be included, and more detailed description of the corresponding parameters may be verified in Wi-Fi Peer-to-Peer Services (P2Ps) Technical Specification Version 1.1, and so on.

Hereinafter, parameters that are newly included in the method according to S510 will be described.

TABLE 1

| Parameter | Description/Function |
|---|---|
| Wlan_infrastructure_connectivity_status | Information on whether or not connection is established with a Wi-Fi infrastructure |
| wlan_infrastructure_ssid | WLAN SSID of a connected Wi-Fi infrastructure |
| p2p_operating_class | Operating class for a P2P connection |
| wlan_operating_class | Operating class for a Wi-Fi infrastructure connection |
| p2p_operating_channel | Operating channel information for a P2P connection |
| wlan_operating_channel | Operating channel information for a Wi-Fi infrastructure connection |
| p2p_service_mac_address | p2p device MAC address of a service advertiser (p2p device that has generated an advertisement ID) |
| wlan_infrastructure_service_mac_address | Wi-Fi infrastructure connection MAC address of a service advertiser (p2p device that has generated an advertisement ID) |
| neighbor_p2p_device_mac_address | MAC address information of a neighboring P2P device being connected to a WLAN (information on multiple neighboring devices may be included) |
| neighbor_p2p_devIce_operationg_channel | Operating channel information of a neighboring P2P device being connected to a WLAN (information on multiple neighboring devices may be included) |
| p2p_ip_address | IP address allocated to the P2P device |
| p2p_port_info | Port information allocated to the p2p device |
| wlan_ip_address | ip address allocated to a wlan |
| wlan_port_info | port information allocated to a wlan |

TABLE 1-continued

| Parameter | Description/Function |
| --- | --- |
| p2p_device_info | As information being included in the P2P Device Information attribute, which is defined in the related art ASP (ASP1), this parameter includes Config method, primary device type, number of secondary device types, secondary device type list, device name, and so on. |
| p2p_group_info | As information being included in the P2P group Information attribute, which is defined in the related art ASP1, this parameter includes List of P2P client info descriptor(s) for P2P devices associated with this P2P group owner; P2P client info descriptor (p2p device address, p2p interface address, device capability bitmap, config methods, primary device type, number of secondary device types, secondary device type list, device name), and so on. |
| p2p_listen_channel | Channel that the p2p device listens in order to perform the discovery procedure |
| neighbor_p2p_listen_channel | Channel that a neighboring p2p device listens in order to perform the discovery procedure |

Among the above-described Table 1, at least is included in the method according to S510, and, accordingly, information on a service being provided through a Wi-Fi infrastructure connection (Wi-Fi service) is delivered (or transported) to the ASP2 of Device B, thereby advertising the related information to Device A. By using the method (AdvertiseService( )) corresponding to step S510 of FIG. 5, it is possible for the ASP2 to acquire information included in the method.

Device A, which corresponds to a Service Seeker, seeks (or discovers) a specific Wi-Fi service (i.e., a service corresponding to "org.wi-fi.wfds.send.rx") by using a specific message (i.e., a seek service method). More specifically, Device A delivers (or transports) a SeekService method for seeking a service corresponding to "org.wi-fi.wfds.send.rx" to the ASP2 (S515).

The Seek Service method according to step S515 may include a P2P device MAC address and a service name (org.wi-fi.wfds.send.rx) of a service that is intended to be sought (or discovered). The ASP2, which has received the Seek Service method according to step S515, may broadcast a P2P Probe Request message (S520). A hash value corresponding to a service string (org.wi-fi.wfds.send.rx) may be included in the corresponding probe request message. More specifically, the corresponding service string may be converted to a hash value by a specific hash function and may then be included in the probe request message.

In case a service included in the ASP2 of Device B, which has received the P2P Probe Request message, matches with a hash value (i.e., Service Hash value) included in the P2P Probe Request, a response may be sent by using a P2P Probe Response message (S525). The corresponding P2P Probe Response message may include a service name, a P2P device MAC address of Device B, and an Advertisement ID. The Advertisement ID is an identifier for uniquely identifying an advertisement in the device corresponding to a Service Advertiser. The Advertisement ID is also used in the procedure for establishing an ASP session. In the example of FIG. 5, in case the hash value included in the method (AdvertiseService) according to S505 matches with the hash value included in the probe request message of S520, the corresponding Advertisement ID may be included. By performing step S525, Device A, which has received the P2P probe response including the service name of the service being sought, may determine that the Discovery procedure for the device and service has been successfully performed.

Meanwhile, in case the seeking of an additional service is wanted, a Service Discovery procedure may be additionally performed.

Steps S535 to S545 of FIG. 5 correspond to a procedure for performing Service Discovery according to the Wi-Fi infrastructure. More specifically, in the above-described steps S515 to S530, information on the service that is being supported cannot be acquired through the Wi-Fi infrastructure connection. Steps S535 to S545 are proposed in order to enhance this problem.

Device A of FIG. 5 transmits additional signaling to the ASP2 (S535). More specifically, the Seek Service method according to step S535 is delivered (or transported) to the ASP2 of Device A in order to seek (or discover) the user equipment (or device) supporting "org.wi-fi.wfds.send.rx" through a WLAN/Wi-Fi Infrastructure connection. At this point, a WLAN interface MAC address and a service name of the service that is to be discovered (i.e., org.wi-fi.wfds-.send.rx) may be included in the corresponding method (SeekService( )). In case a Wi-Fi interface MAC address (legacy Wi-Fi device MAC address/i.e., device MAC address according to a Wi-Fi infrastructure connection) is included in the corresponding method (SeekService( )) and then transported (or delivered), this exemplary embodiment proposes that a user equipment (or device) sends a request to the ASP2 to seek a service that is supported through a Wi-Fi infrastructure by using the Seek Service (SeekService( )) method.

The method corresponding to step S535 may be additionally include the information that will hereinafter be described in detail. For example, requested details on a service that is intended to be sought—for example, a WLAN interface MAC address (or BSSID) of a service matching device, a P2P device MAC address of a service matching device, a P2P service advertisement ID, a WLAN service advertisement ID, and other factor values being included in an ASP2 Advertise Service method—may be loaded in a service information request (Service_information_request) field and may then be transmitted. According to another example, even in a case when a WLAN interface MAC address (legacy Wi-Fi device MAC address/i.e., device MAC address according to a Wi-Fi infrastructure connection) and a P2P device MAC address are included in the Seek Service (SeekService( )) method and then transported, it may be defined that a user equipment (or device) sends a request to the ASP2 to seek a service that is supported through a Wi-Fi infrastructure connection by using the Seek Service (SeekService( )) method, or it may be defined that a user equipment (or device) sends a request to the ASP2 to simultaneously seek a service that is supported through a P2P connection and a service that is supported through a Wi-Fi infrastructure connection. According to yet another example, in case a P2P device belongs to a P2P group a P2P connection is established, when seeking a service that is supported through a Wi-Fi infrastructure connection, a WLAN interface MAC address (legacy Wi-Fi device MAC address/i.e., device MAC address according to a Wi-Fi infrastructure connection) and a P2P interface MAC address may be included in the Seek Service (SeekService( )) method and may then be delivered.

When the above-described method of step S535 is received by the ASP2, the ASP2 configures an IP packet for discovering a service corresponding to the Seek Service (SeekService( )) method and transmits the configured IP packet (S540). It is preferable that the IP packet is configured based on a protocol that discovers devices (or equipments) within the network without any interruption and performs connection, such as Universal Plug and Play (UPnP) or Bonjour. It is preferable that the corresponding IP packet includes at least one of the information fields described below. More specifically, examples of the information fields that may be included in the corresponding IP packet may include 1) a service name of a service that is to be sought (or searched) (e.g., org.wi-fi.wfds.send.rx), 2) information on a network or connection type supporting the service that is to be sought (or searched) (e.g., information indicating a Wi-Fi infrastructure connection), 3) WLAN BSSID, 4) WLAN SSID, 5) P2P device MAC address of a P2P device supporting a requested service, 6) WLAN interface MAC address of a WLAN interface supporting a requested service (i.e., MAC address of a related art infrastructure Wi-Fi), 7) P2P service advertisement ID, 8) WLAN service advertisement ID—in case the same service can be provided to the same user equipment (or device) through both P2P and WLAN infrastructure, the P2P service advertisement ID and the WLAN service advertisement ID may be identical to one another—, and 9) other information related to the Seek Service.

When an IP packet carrying the above-described request information is delivered to as destination address, the corresponding devices determine whether or not the hash values match, and the devices having matching hash values loads the information requested by Device A in the IP packet and transmits the IP packet carrying the requested information to Device A (S540).

The ASP2 of Device A reports the Seek (or Search) result, which is acquired from the IP packet, to a service layer (S545). More specifically, Device A, which has received the IP packet including the information that matches the requested information, may recognize the fact that Device B supports the service that is intended to be sought (or searched). Also, information indicating that Device B may support a service (i.e., org.wi-fi.wfds.send.rx) through a P2P connection and that Device B may also support the corresponding service (org.wi-fi.wfds.send.rx) through a WLAN infrastructure connection based on the received information, which will be described below, may be acquired.

The signaling according to step S545 may include at least one of 1) a service name (e.g., org.wi-fi.wfds.send.rx), 2) a P2P device MAC address, 3) a WLAN interface MAC address (legacy wi-fi mac address), 4) a P2P service advertisement ID, and 5) a WLAN service advertisement ID, and the signaling may also include information on a BSSID. Based on such information, Device A may be capable of identifying whether the org.wi-fi.wfds.send.rx service being supported through the P2P connection and the org.wi-fi.wfds.send.rx service being supported through the WLAN infrastructure connection correspond to services both being supported by the same user equipment (or device) or whether each of the services corresponds to a service that is supported by a different device (e.g, the device supporting the org.wi-fi.wfds.send.rx service being supported through the P2P connection may be referred to as "Device C", and the org.wi-fi.wfds.send.rx service being supported through the WLAN infrastructure connection may be referred to as "Device D").

The example of FIG. 5 corresponds to an example, wherein Device B provides a service through a P2P connection, and wherein Device B also provides the same service through a Wi-Fi infrastructure connection. Additionally, the example of FIG. 5 corresponds to a case when Device A is provided with the service by selecting the P2P connection between the P2P connection and the Wi-Fi infrastructure connection. In this case, Device A performs the step for setting up a P2P group shown in FIG. 3 and the step for setting up a P2P session shown in FIG. 4 (S550), and then Device A receives the service through the P2P connection (S555).

Meanwhile, in a situation of being provided with a service through the P2P connection, it may be required to switch the connectivity scheme to the Wi-Fi infrastructure connection. Alternatively, in a situation of being provided with a service through a Wi-Fi infrastructure connection, the connectively scheme may be switched to the P2P connection. Such switching of the connectivity scheme (or connection) may be determined by a service layer or ASP2 of Device A and may also be determined by a service layer or ASP2 of Device B. In the example of FIG. 5, the service layer of Device A may determine the switching to the Wi-Fi infrastructure connection (S560).

The service layer of Device A shown in FIG. 5 calls (or summons) a method (Change_Session( )). By using the corresponding method, the ASP2 delivers a message requesting a change in the connection (e.g., a CHANGE_SESSION_REQUEST message according to an ASP2 coordination protocol), which is proposed in the exemplary embodiment, to Device B (S570). It is preferable that CHANGE_SESSION_REQUEST, which is proposed in accordance with step S570, includes at least one of the information field of Table 2 shown below.

TABLE 2

| Field | Size | Value | Description |
|---|---|---|---|
| Sequence Number | 1 | variable | Sequence Number is assigned at transmission time. |
| session_mac | 6 | variable | Value included in REQUEST_SESSION message, when setting up ASP session, as shown in FIG. 4 |
| session_id | 4 | variable | Value included in REQUEST_SESSION message, |

TABLE 2-continued

| Field | Size | Value | Description |
|---|---|---|---|
| switched_service_mac | | | when setting up ASP session, as shown in FIG. 4 MAC address of a device providing a service to a connection type (e.g., WLAN Infrastructure) that is switched. MAC address of a device advertising a service (calling (or summoning) an AdvertiseService method) to a connection type (e.g., WLAN Infrastructure) that is switched. MAC address of an interface being switched by a device receiving a CHANGE_SESSION_REQUEST message. The device may acquire in advance a switched_service_mac value in the Device & Service Discovery step. |
| advertisement_id | | | ID value returned to a device providing a service to a connection type (e.g., WLAN Infrastructure) that is switched by calling (or summoning) an AdvertiseService ( ) method. The device may acquire in advance an advertisement_id value in the Device & Service Discovery step. |
| IP address | | | WLAN or P2P IP address assigned to the Device transmitting CHANGE_SESSION_REQUEST - in case of switching from a P2P connection to a WLAN infrastructure connection, a WLAN IP address is included, and, in case of switching from a WLAN infrastructure connection to a P2P connection, a P2P IP address is included. |
| Reason | | | This field indicates a reason for switching the connection. 0x00: unknown 0x01: Switching performed by user (change by user) 0x02: Service using current connection mode (e.g., P2P or WLAN connection) is not available 0x03: System failure 0x04-0xFF: Reserved. |

As shown in FIG. 5, the ASP2 of Device B may notify a change in the connection to the service layer (S575). Also, Device B may transmit a response message (more specifically, a CHANGE_SESSION_RESPONSE message) corresponding to the message requesting a change in the connection (S580). More specifically, Device B may accept or reject the CHANGE_SESSION_REQUEST, which is requested by Device A, through the response message of step S580. The response message of step S580 in FIG. 5 may include at least one of the fields indicated in the table shown below.

TABLE 3

| Field | Size | Value | Description |
|---|---|---|---|
| Sequence Number | 1 | variable | Sequence Number that is assigned at transmission time |
| session_mac | 6 | variable | session_mac included in CHANGE_SESSION_REQUEST |
| session_id | 4 | variable | session_id included in CHANGE_SESSION_REQUEST |
| switched_service_mac | | | switched_service_mac included in CHANGE_SESSION_REQUEST |
| IP address | | | WLAN or P2P IP address assigned to the Device transmitting CHANGE_SESSION_RESPONSE - in case of switching from a P2P connection to a WLAN infrastructure connection, a WLAN IP address is included, and, in case of switching from a WLAN infrastructure connection to a P2P connection, a P2P IP address is included. |
| Status | | | This field may include information on Accept or Reject. 0x00: Accept 0x01: Reject 0x02-0xff: Reserved |

The ASP2 of Device A that has received a signaling, which is set to Accept by the Status field within the response message (more specifically, the CHANGE_SESSION_RESPONSE message), notifies to the service layer that the connectivity scheme is changed (or switched) (S585). Also, by using the ASP coordination protocol, Device A performs a Session Establishment procedure (not shown) corresponding to the changed connectivity scheme. The corresponding Session Establishment procedure may correspond to steps S410, S420, and S430 of FIG. 4. When the Session Establishment procedure is completed, Device A and Device B transmits and receive a service to and from one another through the changed (or switched) connection interface—i.e., in FIG. 5, the switched WLAN infrastructure connection.

According to another example of FIG. 5, steps S565 to S585 may be performed after the Session Establishment procedure (not shown). In this case, a session is established by using the connectivity scheme, which is switched and connected during the Session Establishment procedure, and, afterwards, in steps S565 to S585, the change in the session is confirmed by using the changed (or switched) connectivity scheme.

In step S560 of FIG. 5, an operation of determining the switching of the connectivity scheme is performed by Device A. The standard for determining whether or not to perform such switching of the connectivity scheme may be diversely configured.

First of all, step S560 may be performed by using information on whether or not a Received Channel Power Indicator (RCPI) has exceeded a predetermined threshold value (i.e., RCPI Threshold). The threshold value for the RCPI may be transmitted and received during a connection capability negotiation procedure between Device A and Device B. More specifically, the threshold value for the RCPI may also be included in the P2P provision discovery request/response frames, which are shown in S320, and so on, of FIG. 3, and may also be included in a frame that is newly defined for a capability negotiation.

Meanwhile, apart from the RCPI, step S560 may be performed based on whether or not a Receive Signal Strength Indicator (RSSI) exceeds a predetermined threshold value (RSSI Threshold), or step S560 may be performed based a number of packets that are dropped, and, in this case, the threshold value (i.e., threshold value corresponding to the RSSI or threshold value corresponding to the number of packets that are dropped) may also be included in the P2P provision discovery request/response frames, which are shown in S320, and so on, of FIG. 3, and may also be included in a frame that is newly defined for a capability negotiation.

Meanwhile, in case the RCPI, the RSSI, or the number of dropped packets are used as a standard for determining the switching (or change in) the connectivity scheme, when the connectivity scheme is switched from the P2P connection to the Wi-Fi infrastructure connection or switched from the Wi-Fi infrastructure connection to the P2P connection, information on the RCPI/RSSI/number of dropped packets may be further included. More specifically, as a reason for switching the connectivity scheme, it may be indicated in the Reason field of Table 2 that the RCPI has decreased to a level below the threshold value or that the RSSI or the number of dropped packets has decreased to a level below the threshold value.

As described above, in the example of FIG. 5, although the determination of step S560 is performed by the service layer of Device A, the corresponding determination may also be performed by the ASP2 of Device A, and the corresponding determination may also be performed by the service layer or ASP2 of Device B. And, in case the determination is performed by Device B, it may also be possible for Device B to change (or switch) the connectivity scheme by using the signaling of steps S565 to S585.

Figure 6:
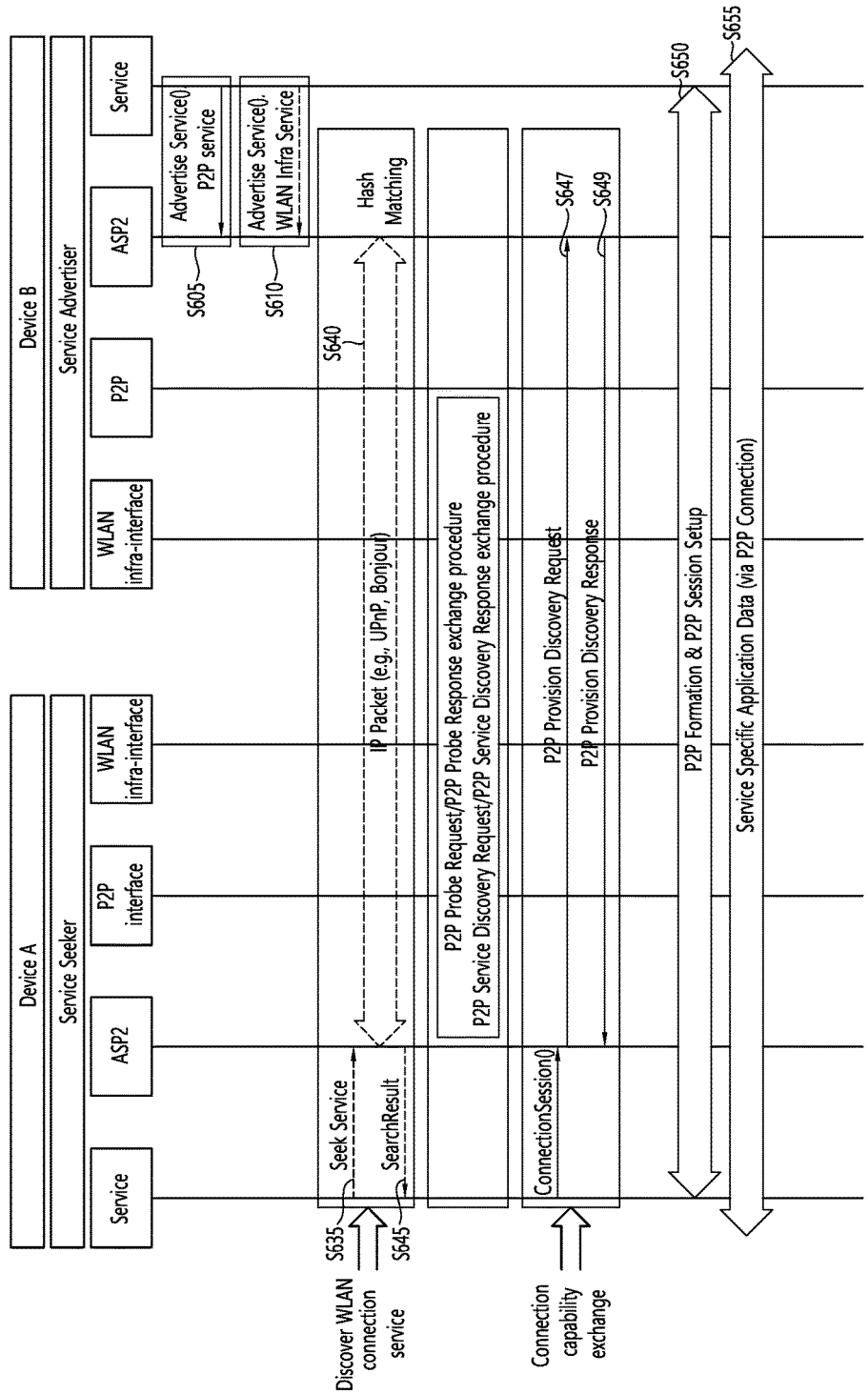
FIG. 6 is a procedure flow chart describing an example of changing the connection technique according to this specification.

FIG. 6 is a procedure flow chart describing an example of changing the connection technique according to this specification. When comparing the example of FIG. 6 with the example of FIG. 5, the example of FIG. 6 corresponds to an example, wherein, in case Device A first seeks a device providing the service (i.e., Device B) based on the WLAN infrastructure connection, Device A simplifies the procedure for seeking P2P connection device and device.

As shown in FIG. 6, Device B notifies information on the service that it supports to the ASP2 through a method (AdvertiseService ( )). By using the corresponding method, the counterpart device (e.g., Device A) may acquire information on the service that is supported by Device B by requesting the corresponding information to the ASP2 of Device B. More specifically, the procedure for advertising a service that is supported through a P2P connection may be performed through step S605 of FIG. 6, and the procedure for advertising a service that is supported through a Wi-Fi infrastructure connection may be performed through step S610 of FIG. 6. Step S605 and step S610 of FIG. 6 respectively correspond to step S505 and step S510 of FIG. 5.

In the example of FIG. 6, for Device A, step S635 to step S645 respectively correspond to step S535 to step S545 of FIG. 5. More specifically, device A of FIG. 6 may seek not only the P2P connection service but also services through other connections (i.e., Wi-fi infrastructure connection) by using the method (the method according to step S635), which is proposed in this exemplary embodiment. Device A transmits an IP packet for seeking a user equipment (or device) and service and, then, receives a response from the discovered (or sought) device and, then, acquires the wanted information. By performing this procedure, Device A may not only be provided with information on the service that can be provided through the WLAN infrastructure connection but may also be provided with information on the service that can be provided through the P2P connection.

More specifically, since Device A has acquired the device (i.e., Device B) providing the P2P service that matches the service, which Device A intends to seek, during the procedure of transmitting and receiving the previous IP packet, the procedure for seeking the P2P service providing service and device (i.e., exchange of P2P probe request/response messages, exchange of service discovery request/response messages) may be carried out quickly. In other words, the step S647 may be carried out quickly by using the information acquired in step S640. This is because shifting may be quickly performed to the corresponding channel by using a P2P Listen Channel among the information on the P2P connection, which is acquired during the IP packet exchange procedure according to step S640, thereby allowing step S647 (i.e., exchange of P2P probe request/response messages, exchange of service discovery request/response messages) to be performed quickly.

Thereafter, in order to transmit and receive information on a Connection capability, Device A transmits and receives a P2P Provision Discovery Request message and a P2P Provision Discovery Response message (S647, S649). The message according to step S647/S649 corresponds to the procedure that is included in step S320 of FIG. 3. Thereafter, Device A configures a P2P group (S650) and may then set up a P2P session and use a service by transmitting and receiving Application Service Data by using any one of the connection schemes (e.g., P2P scheme) (S655). The step of configuring a P2P group and setting up a P2P session may correspond to the respective steps of FIG. 3 and FIG. 4.

Figure 7:
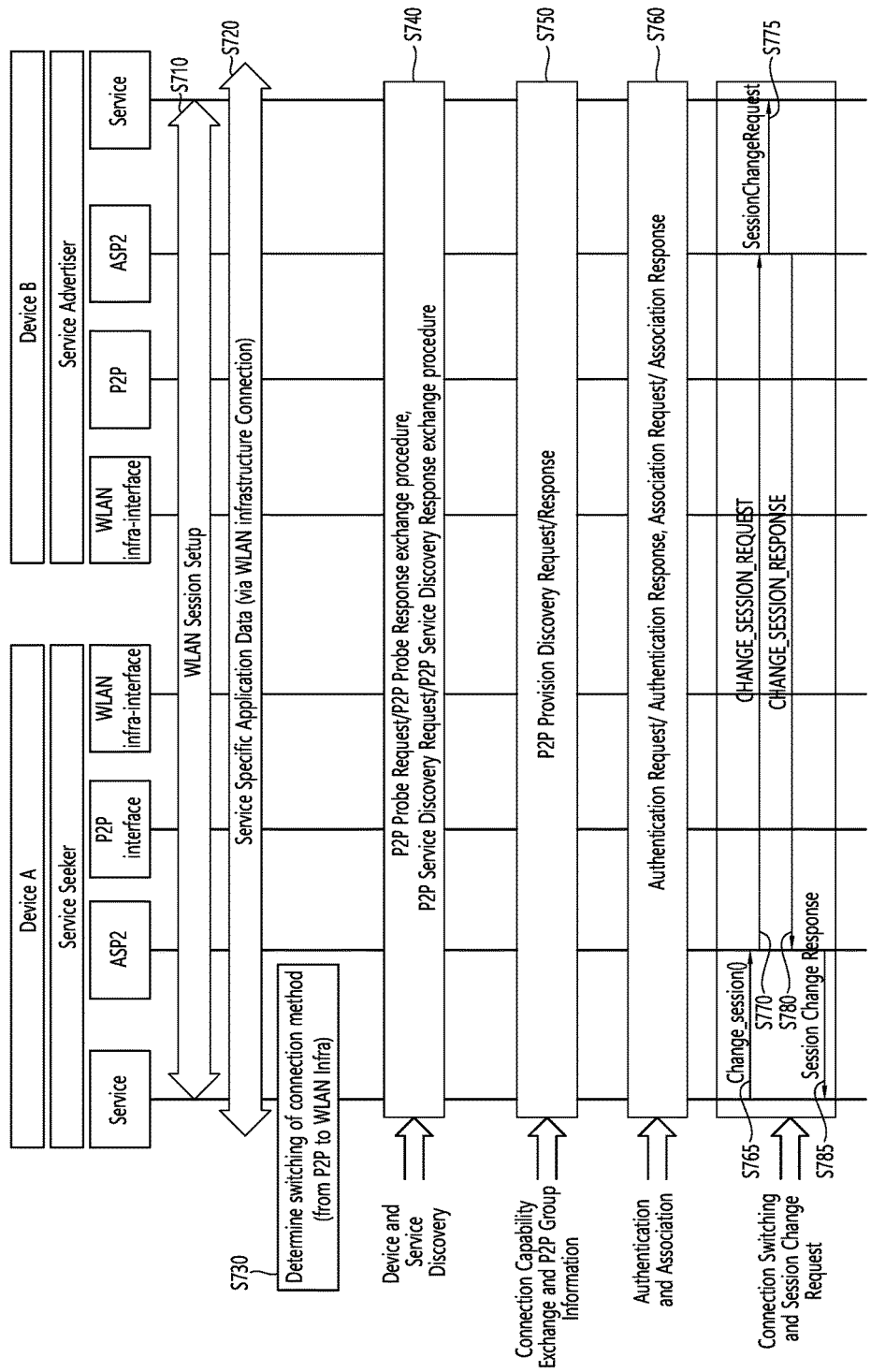
FIG. 7 is a procedure flow chart describing another example of changing the connection technique according to this specification.

FIG. 7 is a procedure flow chart describing another example of changing the connection technique according to this specification.

More specifically, FIG. 7 illustrates an exemplary embodiment of initially using a Wi-Fi service (i.e., ASP2 service) based on a Wi-Fi infrastructure connection between Device A and Device B and then switching the connection method.

Firstly, Device A may set up (or establish) a WLAN session by using a method of setting up a session through an ASP coordination protocol (S710), and, then, Device A may receive a Wi-Fi service through the set-up (or established) WLAN infrastructure connection (S720).

Afterwards, Device A may determine the switching of the connection from the Wi-Fi infrastructure connection to the P2P connection (S730). Herein, the exemplary embodiment corresponds to a case when Device A does not have a P2P connection with Device B. More specifically, in case Device A does not acquire the P2P information (i.e., P2P device information and P2P group information) of Device B, Device A calls (or summons) a SeekService method and delivers it to the ASP2, thereby transmitting and receiving P2P Probe Request and P2P Probe Response messages and Service Discovery Request and Service Discovery Response messages to and from Device B (S740), thereby acquiring P2P Device Information and P2P Group Information of Device B.

For example, the P2P Device Information includes at least one of P2P device address, configuration methods (Config Methods), Primary Device Type, Number of Secondary Device Types, Secondary Device Type List, and Device Name. Additionally, for example, the P2P Group Information may include a list of Client information descriptors (Client Info Descriptors) corresponding to a P2P device that is connected to a P2P Group owner, and such Client information descriptor corresponding to the P2P device (P2P Client Info Descriptor) may include at least one of a P2P device address, a P2P Interface address, a Device Capability Bitmap, configuration methods (Config Methods), a Primary Device Type, a Number of Secondary Device Types, a Secondary Device Type List, and a Device Name.

After performing the Device and Service Discovery procedure according to step S740, Device A may transmit and receive P2P Provision request/response messages for transmitting and receiving information related to the Connection Capability and may then configure (or set up) a P2P group (S750).

After completing the P2P group set-up, Device A performs an Authentication and Association procedure (S760) and transmits and receives signaling for changing (or switching) the connectivity scheme (S765 to S785). More specifically, specific characteristics related to the signaling that changes the connectivity scheme may correspond to steps S565 to S585 of FIG. 5.

Thereafter, a Session Setup according to the P2P connection is performed (not shown), and such Session Setup operation may correspond to the Session Setup operation, which is disclosed in FIG. 4, and so on. Afterwards, a service may be provided through the set-up session.

According to yet another example, the Signaling procedure for changing the connectivity schemes (steps S765 to S785) in FIG. 7 may also be performed after performing the Session Setup (not shown). In this case, the session is set up by using the connectivity scheme, which is changed (or switched) and newly connected during the Session Setup procedure, and, afterwards, the session change is confirmed by using the connectivity scheme, which is changed (or switched) in steps S765 to S785. According to yet another example, the Signaling procedure for changing the connectivity scheme (steps S765 to S785) in FIG. 7 may be performed immediately after performing step S730.

Figure 8:
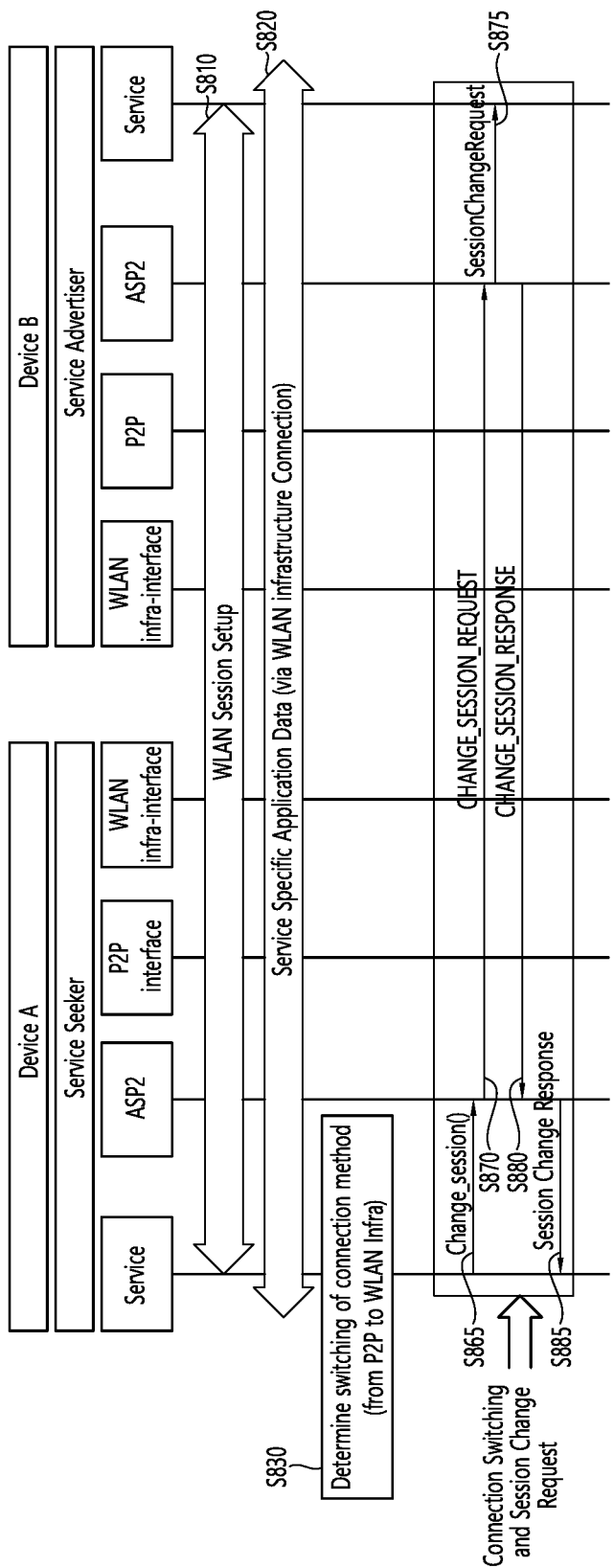
FIG. 8 is a procedure flow chart describing yet another example of changing the connection technique according to this specification.

FIG. 8 is a procedure flow chart describing yet another example of changing the connection technique according to this specification.

More specifically, FIG. 8 illustrates an exemplary embodiment of initially using a Wi-Fi service (i.e., ASP2 service) based on a Wi-Fi infrastructure connection between Device A and Device B and then switching the connection method.

When comparing the example of FIG. 8 with the example of FIG. 7, most of the operations in the example of FIG. 8 is the same as the example of FIG. 7 except for an operation, wherein Device A acquires information on the P2P connectivity scheme in advance in a state of switching the connectivity scheme to the P2P connection. More specifically, steps S810 to S830 of FIG. 8 respectively correspond to steps S710 to S730 of FIG. 7, and steps S865 to S885 of FIG. 8 respectively correspond to steps S765 to S785 of FIG. 7.

Meanwhile, just as in the example of FIG. 7, the Signaling procedure for changing the connectivity scheme (steps S865 to S885) in FIG. 8 may be performed either before or after performing the Session Setup (not shown).

Figure 9:
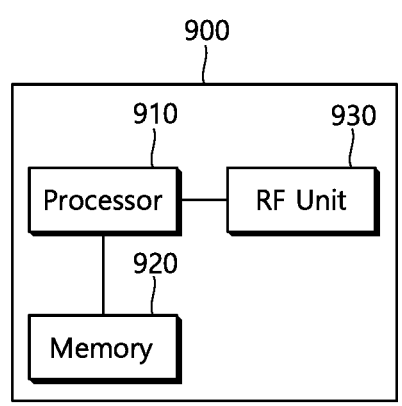
FIG. 9 is a block diagram of a wireless device according to one embodiment of the present invention.

FIG. 9 is a block diagram of a wireless device according to one embodiment of the present invention.

The wireless device 900 includes a processor 910, a memory 920, and a radio frequency (RF) unit 930.

The RF unit 930 is connected with the processor 910 and transmits and/or receives radio signals.

The processor 910 implements the proposed functions, procedures, and/or methods. For example, the processor 910 may be configured to perform the operations of device A or device B according to the above-described exemplary embodiment of the present invention. The processor 910 may perform the procedures of FIG. 3 to FIG. 8.

The processor 910 may include an application-specific integrated circuit (ASIC), another chip set, a logical circuit, a data processing device, and/or a converter converting a baseband signal and a radio signal to and from one another. The memory 920 may include a read-only memory (ROM), a random access memory (RAM), a flash memory, a memory card, a storage medium, and/or another storage device. The RF unit 930 may include one or more antennas transmitting and/or receiving radio signals.

When the exemplary embodiment is implemented as software, the above-described method may be implemented as a module (process, function, and so on) performing the above-described functions. The module may be stored in the memory 920 may be executed by the processor 910. The memory 920 may be located inside or outside of the processor 910 and may be connected to the processor 910 through a diversity of well-known means.

What is claimed is:

1. A method for receiving a Wi-Fi service in a wireless LAN station supporting an application service platform (ASP), comprising:

receiving, by the ASP, a first seek service message and acquiring information on a wireless LAN station providing the Wi-Fi service through a Wi-Fi direct connectivity by using the first seek service message;

receiving, by the ASP, a second seek service message and acquiring information on a wireless LAN station providing the Wi-Fi service through a Wi-Fi Infrastructure connectivity by using the second seek service message;

selecting any one of the Wi-Fi direct connectivity and the Wi-Fi Infrastructure connectivity, based on the information acquired by using the first seek service message and the second seek service message, and receiving the Wi-Fi service by using the selected connectivity; and determining whether or not to receive the Wi-Fi service through a connectivity that is different from the connectivity selected between the Wi-Fi Direct connectivity and the Wi-Fi Infrastructure connectivity.

2. The method of claim 1, further comprising:

transmitting a message requesting a change in the connectivity, in case the Wi-Fi service is received through a connectivity that is different from the selected connectivity.

3. The method of claim 2, wherein the message requesting a change in the connectivity further comprises:

information related to a wireless LAN station providing the Wi-Fi service through the Wi-Fi Infrastructure connectivity, or information related to a wireless LAN station providing the Wi-Fi service through the Wi-Fi Direct connectivity.

4. The method of claim 3, wherein the information related to a wireless LAN station providing the Wi-Fi service through the Wi-Fi Infrastructure connectivity corresponds to a MAC address of a wireless LAN station providing the Wi-Fi service through the Wi-Fi Infrastructure connectivity, and wherein the information related to a wireless LAN station providing the Wi-Fi service through the Wi-Fi Direct connectivity corresponds to a MAC address of a wireless LAN station providing the Wi-Fi service through the Wi-Fi Direct connectivity.

5. The method of claim 1, wherein the acquiring information on a wireless LAN station providing the Wi-Fi service through a Wi-Fi Direct connectivity comprises:

transmitting a probe request message by using information included in the first seek service; and receiving a probe response message corresponding to the probe request message.

6. The method of claim 1, wherein the acquiring information on a wireless LAN station providing the Wi-Fi service through a Wi-Fi Infrastructure connectivity comprises:

configuring an IP packet by using information included in the second seek service and transmitting the configured IP packet.

7. The method of claim 1, wherein the information related to a wireless LAN station providing the Wi-Fi service through the Wi-Fi Infrastructure connectivity comprises:

a MAC address of a wireless LAN station providing the Wi-Fi service through the Wi-Fi Infrastructure connectivity, and identification information of an access point (AP) providing the Wi-Fi Infrastructure connectivity.

8. The method of claim 1, wherein the Wi-Fi Direct connectivity corresponds to a connectivity scheme providing connectivity between wireless stations without using an access appoint (AP), and wherein the Wi-Fi Infrastructure connectivity corresponds to a connectivity scheme providing connectivity between wireless stations by using an AP.

9. A wireless LAN station, comprising:

a radio frequency (RF) unit transmitting and receiving radio signals; and a processor unit being connected to the RF unit and supporting an application service platform (ASP), wherein the processor is configured:

to receive a first seek service message and to acquire information on a wireless LAN station providing the Wi-Fi service through a Wi-Fi direct connectivity by using the first seek service message, to receive a second seek service message and to acquire information on a wireless LAN station providing the Wi-Fi service through a Wi-Fi Infrastructure connectivity by using the second seek service message, to select any one of the Wi-Fi direct connectivity and the Wi-Fi Infrastructure connectivity, based on the information acquired by using the first seek service message and the second seek service message, and to receive the Wi-Fi service by using the selected connectivity, and to determine whether or not to receive the Wi-Fi service through a connectivity that is different from the connectivity selected between the Wi-Fi Direct connectivity and the Wi-Fi Infrastructure connectivity.

10. The LAN system of claim 9, wherein the processor is configured to transmit a message requesting a change in the connectivity, in case the Wi-Fi service is received through a connectivity that is different from the selected connectivity.

11. The LAN system of claim 10, wherein the message requesting a change in the connectivity further comprises:

information related to a wireless LAN station providing the Wi-Fi service through the Wi-Fi Infrastructure connectivity, or information related to a wireless LAN station providing the Wi-Fi service through the Wi-Fi Direct connectivity.

12. The wireless LAN of claim 11, wherein the information related to a wireless LAN station providing the Wi-Fi service through the Wi-Fi Infrastructure connectivity corresponds to a MAC address of a wireless LAN station providing the Wi-Fi service through the Wi-Fi Infrastructure connectivity, and wherein the information related to a wireless LAN station providing the Wi-Fi service through the Wi-Fi Direct connectivity corresponds to a MAC address of a wireless LAN station providing the Wi-Fi service through the Wi-Fi Direct connectivity.

\* \* \* \* \*